US011200179B2

(12) United States Patent
Hanna et al.

(10) Patent No.: US 11,200,179 B2
(45) Date of Patent: Dec. 14, 2021

(54) FACILITATING SEQUENTIAL READS IN MEMORY SUB-SYSTEMS

(71) Applicant: Micron Technology, Inc., Boise, ID (US)

(72) Inventors: Stephen Hanna, Fort Collins, CO (US); Nadav Grosz, Broomfield, CO (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 16/801,949

(22) Filed: Feb. 26, 2020

(65) Prior Publication Data

US 2021/0263864 A1    Aug. 26, 2021

(51) Int. Cl.
| | |
|---|---|
| *G06F 12/00* | (2006.01) |
| *G06F 13/00* | (2006.01) |
| *G06F 13/28* | (2006.01) |
| *G06F 12/14* | (2006.01) |
| *G06F 1/24* | (2006.01) |
| *G06F 21/79* | (2013.01) |
| *G06F 12/06* | (2006.01) |
| *G06F 12/02* | (2006.01) |

(52) U.S. Cl.
CPC ............ *G06F 12/1458* (2013.01); *G06F 1/24* (2013.01); *G06F 12/0246* (2013.01); *G06F 12/06* (2013.01); *G06F 12/1441* (2013.01); *G06F 21/79* (2013.01); *G06F 2212/7201* (2013.01); *G06F 2221/2153* (2013.01)

(58) Field of Classification Search
CPC .. G06F 12/06; G06F 12/1441; G06F 12/0246; G06F 12/0623
USPC ........................................................ 711/163
See application file for complete search history.

(56) References Cited

U.S. PATENT DOCUMENTS

| | | | |
|---|---|---|---|
| 2007/0283428 A1* | 12/2007 | Ma ........................ | G06F 21/78 726/9 |
| 2015/0074329 A1* | 3/2015 | Kondo ................ | G06F 12/1408 711/103 |
| 2016/0224089 A1* | 8/2016 | Lin ..................... | G06F 12/0246 |

(Continued)

FOREIGN PATENT DOCUMENTS

WO         2020028804 A1     2/2020

OTHER PUBLICATIONS

PCT Notification of Transmittal of the International Search Report and the Written Opinion of the International Search Authority for PCT Application No. PCT/US2021/019719, dated Jun. 15, 2021, 15 pages.

*Primary Examiner* — Edward J Dudek, Jr.
*Assistant Examiner* — Sidney Li
(74) *Attorney, Agent, or Firm* — Lowenstein Sandler LLP

(57) ABSTRACT

An example memory subsystem includes a memory component and a processing device, operatively coupled to the memory component. The processing device is configured to receive a plurality of logical-to-physical (L2P) records, wherein an L2P record of the plurality of L2P records maps a logical block address to a physical address of a memory block on the memory component; determine a sequential assist value specifying a number of logical block addresses that are mapped to consecutive physical addresses sequentially following the physical address specified by the L2P record; generate a security token encoding the sequential assist value; and associate the security token with the L2P record.

18 Claims, 8 Drawing Sheets

(56) References Cited

U.S. PATENT DOCUMENTS

| | | |
|---|---|---|
| 2016/0253266 A1 | 9/2016 | Park |
| 2019/0012358 A1* | 1/2019 | Mousseau ............... G06F 30/00 |
| 2019/0065387 A1* | 2/2019 | Duzly ................... G06F 3/0679 |
| 2019/0220416 A1 | 7/2019 | Jung et al. |
| 2019/0235762 A1 | 8/2019 | Kaburaki et al. |

* cited by examiner

| Physical Address 410 (PA) [31:0] | Sequential Assist 450 Count [39:32] | Sub-Region 440 Update Count [51:40] | Power-On Reset 430 Count [63:52] |
|---|---|---|---|
| PA_A+0 | 0x03 | 0xB37 | 0x004 |
| PA_A+1 | 0x02 | 0xB37 | 0x004 |
| PA_A+2 | 0x01 | 0xB37 | 0x004 |
| PA_A+3 | 0x00 | 0xB37 | 0x004 |
| PA_B+0 | 0x00 | 0xB37 | 0x004 |
| PA_C+0 | 0x02 | 0xB37 | 0x004 |
| PA_C+1 | 0x01 | 0xB37 | 0x004 |
| PA_C+2 | 0x00 | 0xB37 | 0x004 |
| PA_D+0 | 0x00 | 0xB37 | 0x004 |
| PA_E+0 | 0x00 | 0xB37 | 0x004 |

Security token 420

FIG. 4

| LBA 630 | Sequential Assist 620 | PA 610 |
|---|---|---|
| 0x20 | 2 | 0x12 |
| 0x21 | 1 | 0x13 |
| 0x22 | 0 | 0x14 |
| 0x23 | 6 | 0xA2 |
| 0x24 | 5 | 0xA3 |

FIG. 6

FACILITATING SEQUENTIAL READS IN MEMORY SUB-SYSTEMS

TECHNICAL FIELD

Embodiments of the disclosure are generally related to memory sub-systems, and more specifically, are related to facilitating sequential reads in memory sub-systems.

BACKGROUND

A memory sub-system can be a storage system, a memory module, or a hybrid of a storage device and memory module. The memory sub-system can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The present disclosure will be understood more fully from the detailed description given below and from the accompanying drawings of some embodiments of the disclosure.

FIG. 4 schematically illustrates the structure of an example L2P map implemented in accordance with some embodiments of the present disclosure.

FIG. 6 schematically illustrates an example L2P map implemented in accordance with some embodiments of the present disclosure.

DETAILED DESCRIPTION

Figure 1:
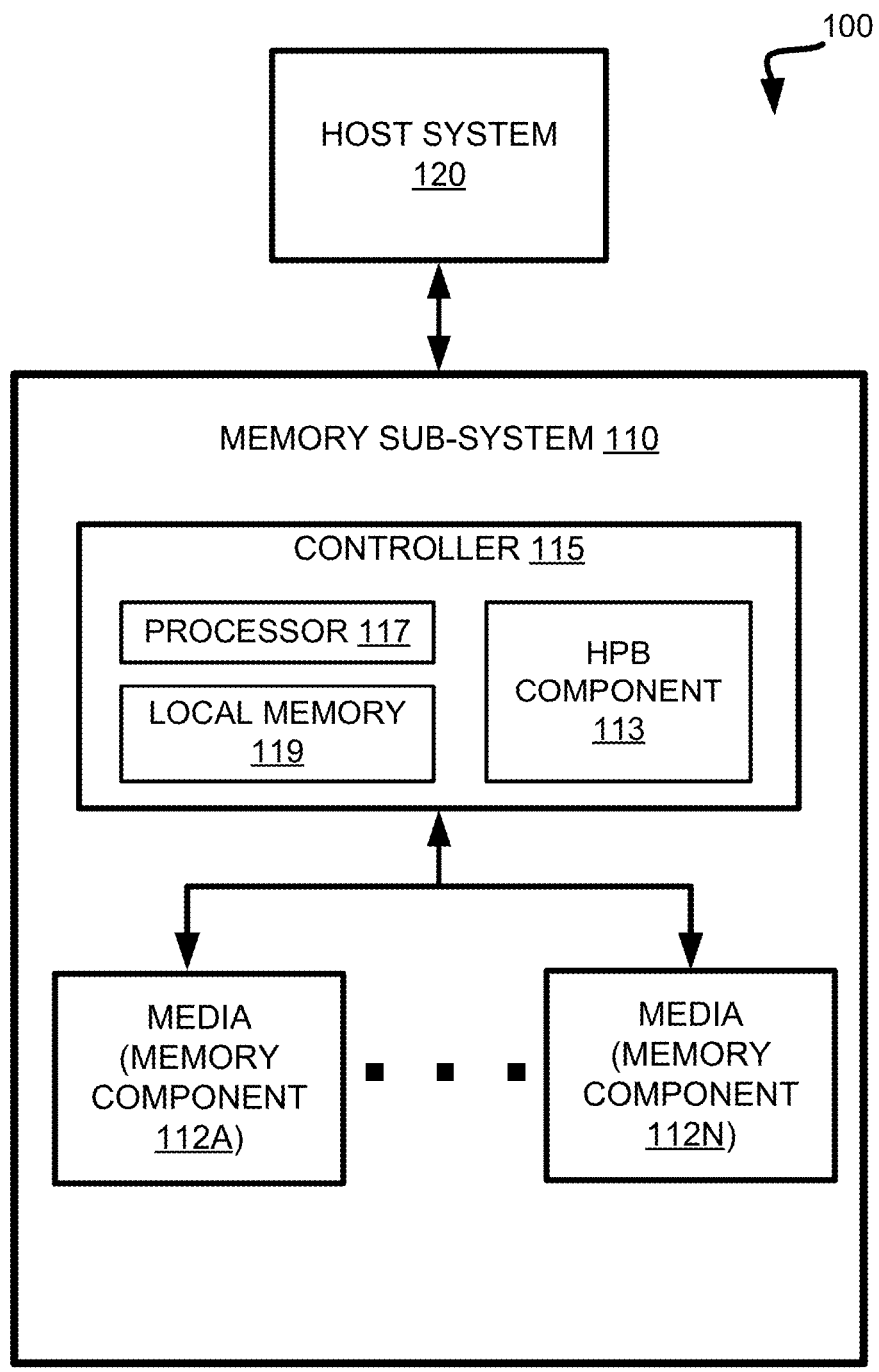
FIG. 1 illustrates an example computing environment that includes a memory sub-system in accordance with some embodiments of the present disclosure.

Embodiments of the present disclosure are directed to facilitating sequential reads in memory sub-systems. A memory sub-system can be a storage device, a memory module, or a hybrid of a storage device and memory module. Examples of storage devices and memory modules are described below in conjunction with FIG. 1. In general, a host system can utilize a memory sub-system that includes one or more memory components. The host system can provide data to be stored at the memory sub-system and can request data to be retrieved from the memory sub-system. The host system identifies memory blocks by their respective logical block addresses (LBAs), which may be represented by integer numbers of a predetermined size.

In order to isolate from the host system various aspects of physical implementations of memory components employed by a memory sub-systems, the memory sub-system can maintain a data structure that maps each LBA to a corresponding physical address (PA). For example, for flash memory, the physical address can include channel identifier, die identifier, page identifier, plane identifier and/or frame identifier. The mapping data structure is referred to herein as a logical-to-physical (L2P) map.

In order to improve the overall efficiency of the data transfer between a host system and a memory sub-system, the L2P map can be cached by the host system in the dynamic random access memory (DRAM), thus allowing the host system to enhance read commands transmitted to the memory sub-system by supplying the PA corresponding to the LBA of the data item to be read by the memory sub-system. Such an approach, referred to as host-aware performance boost (HPB), reduces the read latency by eliminating the need for the memory sub-system to access the L2P map (which can be stored on a non-volatile memory component exhibiting the access times that exceed, by several orders of magnitude, the access time to the host's DRAM) in order to perform the LBA to PA translation.

However, various common implementations of HPB only support single LBA random reads. Accordingly, embodiments of the present disclosure address the above-noted and other deficiencies by implementing a memory sub-system that supports HPB with variable length random reads, thus significantly improving the overall efficiency of the data transfer between the host system and the memory sub-system.

In accordance with embodiments of the present disclosure, each L2P record cacheable by the host system is enhanced with a sequential assist value, which stores the number of consecutive LBAs that are mapped to consecutive PAs sequentially following the PA mapped to the current LBA. In an illustrative example, if three consecutive LBAs are mapped to three consecutive PAs, the L2P record specified by LBA=1 would have the sequential assist value of two (since the two LBAs, LBA=2 and LBA=3, which follow LBA=1, are mapped to two consecutive PAs that follow the PA mapped to the LBA=1); the L2P record specified by LBA=2 would have the sequential assist value of one (since LBA=3, which follows LBA=2, is mapped to a PA that follows the PA mapped to the LBA=2), while the L2P record specified by LBA=3 would have the sequential assist value of zero (since the PA mapped to LBA=4 is not sequentially following the PA mapped to LBA=4).

Accordingly, each random read command issued by the host would include the PA corresponding to the LBA of the data item to be read by the memory sub-system and the sequential assist value, thus allowing the memory system controller to omit logical-to-physical translations for the logical blocks falling within the range specified by the sequential assist value. In an illustrative example, for the sequential assist value of N, the memory system controller would only need to translate the first LBA to the corresponding PA, and then retrieve the data stored within the physical address range of [PA; PA+N], as described in more detail herein below.

While the L2P records that are transmitted to the host system for caching can be encrypted for security reasons, thus preventing the host from compromising the security and integrity of the memory sub-system by modifying the PA values in the read commands issued to the memory subsystem, certain implementations can reveal the sequential assist values of the L2P records to the host system. Accordingly, the host system would be able to utilize the sequential assist information in order to optimize the read commands issued to the memory sub-system: the host system can split each multi-LBA read command into a sequence of read commands that are aligned with the sequential PAs specified by the respective sequential assist values. In an illustrative example, in order to read N consecutive LBAs, provided that the sequential read assist for LBA[0] is L and the sequential read assist for LBA[L+1] is M, such that L+M>=N, the host system would issue two read commands, such that the first read command would read (L+1) blocks and the second read command would read (N−L−1) blocks, as described in more detail herein below.

Therefore, advantages of the systems and methods implemented in accordance with some embodiments of the present disclosure include, but are not limited to, improving the overall efficiency of the data transfer between the host system and the memory sub-system by relieving the memory system controller from the need to translate multiple consecutive LBAs in situations when the corresponding PAs are also consecutive. Furthermore, advantages of the systems and methods implemented in accordance with some embodiments of the present disclosure also include allowing the host system to utilize the sequential assist values to optimize the read commands issued to the memory sub-system, as described in more detail herein below.

FIG. 1 illustrates an example computing environment 100 that includes a memory sub-system 110 in accordance with some embodiments of the present disclosure. The memory sub-system 110 can include media, such as memory components 112A-112N. The memory components 112A to 112N can be volatile memory components, non-volatile memory components, or a combination of such. A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and a non-volatile dual in-line memory module (NVDIMM).

The computing environment 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. The host system 120 uses the memory sub-system 110, for example, to write data to the memory sub-system 110 and read data from the memory sub-system 110. As used herein, "coupled to" generally refers to a connection between components, which can be an indirect communicative connection or direct communicative connection (e.g., without intervening components), whether wired or wireless, including connections such as electrical, optical, magnetic, etc.

The host system 120 can be a computing device such as a desktop computer, laptop computer, network server, mobile device, or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. As used herein, "coupled to" generally refers to a connection between components, which can be an indirect communicative connection or direct communicative connection (e.g., without intervening components), whether wired or wireless, including connections such as electrical, optical, magnetic, etc. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 120 and the memory sub-system 110. The host system 120 can further utilize an NVM Express (NVMe) interface to access the memory components 112A to 112N when the memory sub-system 110 is coupled with the host system 120 by the PCIe interface. The physical host interface can provide an interface for passing control, address, data, and other signals between the memory sub-system 110 and the host system 120.

The memory components 112A to 112N can include any combination of the different types of non-volatile memory components and/or volatile memory components. Examples of non-volatile memory components include negative-and (NAND) type flash memory and write-in-place memory, such as a three-dimensional cross-point ("3D X-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory components 112A to 112N can include one or more arrays of memory cells such as single level cells (SLCs) or multi-level cells (MLCs) (e.g., triple level cells (TLCs) or quad-level cells (QLCs)). In some embodiments, a particular memory component can include both an SLC portion and a MLC portion of memory cells. Each of the memory cells can store one or more bits of data (e.g., data blocks) used by the host system 120. Although non-volatile memory components such as NAND type flash memory are described, the memory components 112A to 112N can be based on any other type of memory such as a volatile memory. In some embodiments, the memory components 112A to 112N can be, but are not limited to, random access memory (RAM) devices, read-only memory (ROM) devices, dynamic random access memory (DRAM) devices, synchronous dynamic random access memory (SDRAM) devices, phase change memory (PCM) devices, magneto random access memory (MRAM) devices, negative-or (NOR) flash memory devices, electrically erasable programmable read-only memory (EEPROM), and/or 3D X-point" memory devices. Furthermore, the memory cells of the memory components 112A to 112N can be grouped as memory pages or data blocks that can refer to a unit of the memory component used to store data.

The memory system controller 115 (hereinafter referred to as "controller") can communicate with the memory components 112A to 112N to perform operations such as reading data, writing data, or erasing data at the memory components 112A to 112N and other such operations. The controller 115 can include hardware such as one or more integrated circuits and/or discrete components, a buffer memory, or a combination thereof. The controller 115 can be a microcontroller, special purpose logic circuitry (e.g., a field programmable gate array (FPGA), an application specific integrated circuit (ASIC), etc.), or other suitable processor. The controller 115 can include a processor (processing device) 117 configured to execute instructions stored in local memory 119. In the illustrated example, the local memory 119 of the controller 115 includes an embedded memory configured to store instructions for performing various processes, operations, logic flows, and routines that control operation of the memory sub-system 110, including handling communications between the memory sub-system 110 and the host system 120. In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the controller 115, in another embodiment of the present disclosure, a memory sub-system 110 can not include a controller 115, and can instead rely upon external control (e.g., provided by an external host, or by a processor or controller separate from the memory subsystem).

In general, the controller 115 can receive commands or operations from the host system 120 and can convert the commands or operations into instructions or appropriate commands to achieve the desired access to the memory components 112A to 112N. The controller 115 can be responsible for other operations such as wear leveling operations, garbage collection operations, error detection and error-correcting code (ECC) operations, encryption operations, caching operations, and address translations between a logical block address and a physical block address that are associated with the memory components 112A to 112N. The controller 115 can further include host interface circuitry to communicate with the host system 120 via the physical host interface. The host interface circuitry can convert the commands received from the host system into command instructions to access the memory components 112A to 112N as well as convert responses associated with the memory components 112A to 112N into information for the host system 120. In some embodiments, the memory components 112 can include local media controllers (not shown in FIG. 1) that operate in conjunction with memory system controller 115 in order to implement the methods described herein.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the controller 115 and decode the address to access the memory components 112A to 112N.

The memory sub-system 110 includes a HPB component 113 that can be used to implement the HPB with sequential assist in accordance with some embodiments of the present disclosure. In some embodiments, the HPB component 113 can implement the method 500 of generating a sequential assist-enhanced L2P table by a memory subsystem controller, as described in more detail herein below. In some embodiments, the controller 115 includes at least a portion of the HPB component 113. For example, the controller 115 can include a processor 117 (processing device) configured to execute instructions stored in local memory 119 for performing the operations described herein. In some embodiments, the HPB component 113 is part of the host system 120, an application, or an operating system.

The HPB component 113 can receive the L2P map data from the memory subsystem controller and can store the received L2P map data to the host memory, such as dynamic random access memory (DRAM). Since the size of the host memory can reach multiple gigabytes, the host memory can have the capacity for storing tens of megabytes of the L2P map data (and possibly the entire L2P map). The L2P map is indexed by the LBA values, and each L2P map entry includes the PA and the sequential assist value corresponding to the LBA the index of which identifies the L2P map entry. As noted herein above, the sequential assist value reflects the number of consecutive LBAs that are mapped to consecutive PAs sequentially following the PA mapped to the current LBA.

Accordingly, each read command issued by the host can, in addition to the LBA of the data item to be read by the memory sub-system, further include the PA corresponding to the LBA and the sequential assist value, thus allowing the memory system controller to omit logical-to-physical translations for the logical blocks falling within the range specified by the sequential assist value. Further details with regards to the operations of the HPB component 113 are described below.

Figure 2:
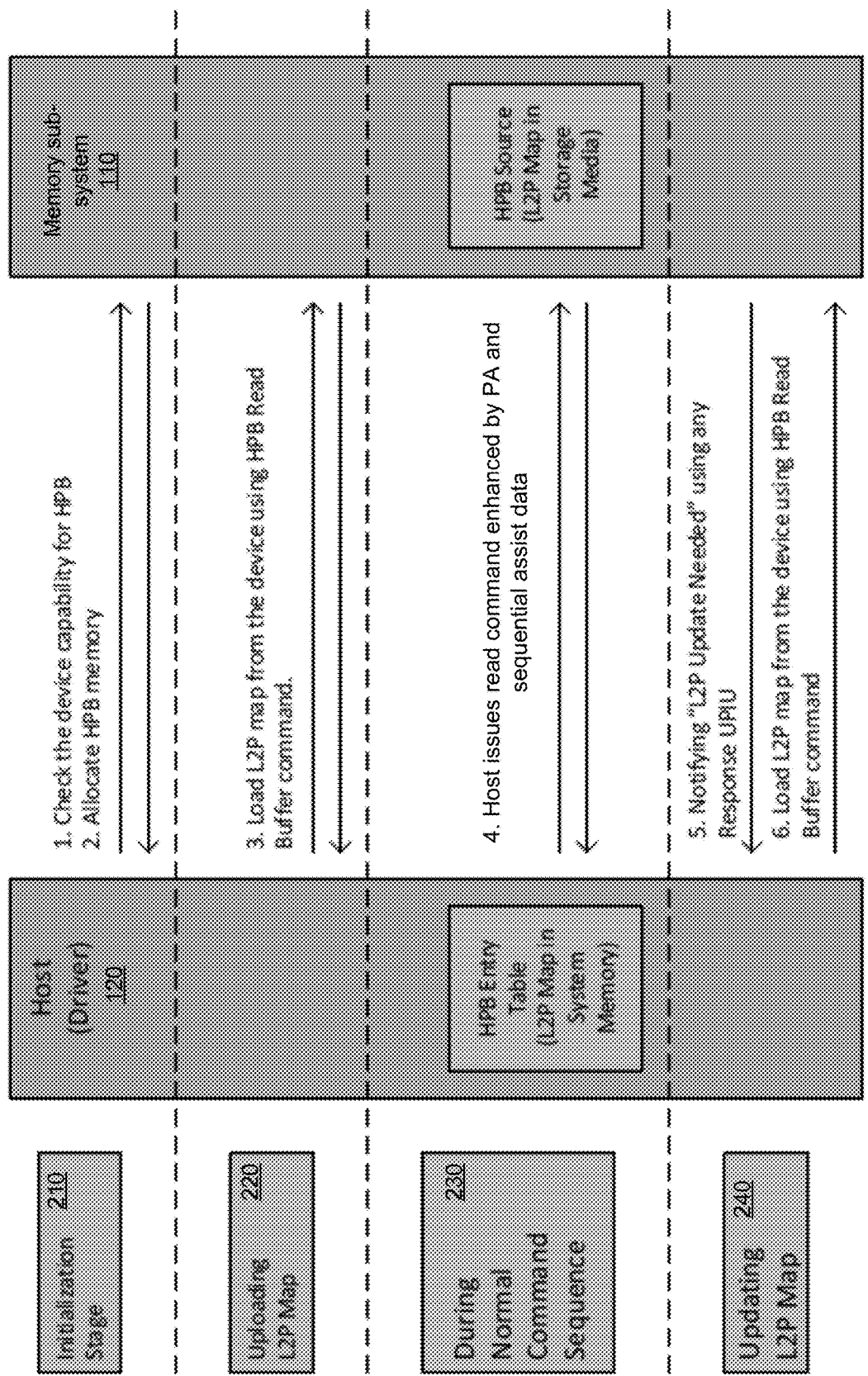
FIG. 2 schematically illustrates interactions of the host system and the memory system controller, in accordance with some embodiments of the present disclosure.

FIG. 2 schematically illustrates interactions of the host system 120 and the memory system controller 115, in accordance with some embodiments of the present disclosure. At the initialization stage (operations 210), the memory driver running on the host system 120 can query the memory system controller 115 in order to identify the HPB features supported by the memory sub-system 110, and can accordingly allocate a host memory buffer for storing the L2P map. The host system 120 can then download the L2P map data (operations 220), by issuing the HPB read buffer command thus causing the memory system controller 115 to send the L2P map data to the host system 120. In some implementations, the L2P map data can be subdivided into multiple regions and sub-regions, as explained in more detail herein below with reference to FIG. 3.

During normal operation (operations 230), the host system 120 can issue read commands to the memory subsystem 110, such that each read command includes the PA corresponding to the LBA of the data item to be read by the memory sub-system and the sequential assist value. The memory subsystem 110 can initiate L2P map update (operations 240) by transmitting to the host a corresponding notification, which can be encoded by any response transmitted to the host system 120 by the memory subsystem 110. Responsive to receiving the notification, the host system 120 can issue the HPB Read Buffer command thus causing the memory system controller 115 to send the L2P mapping data to the host system 120.

Figure 3:
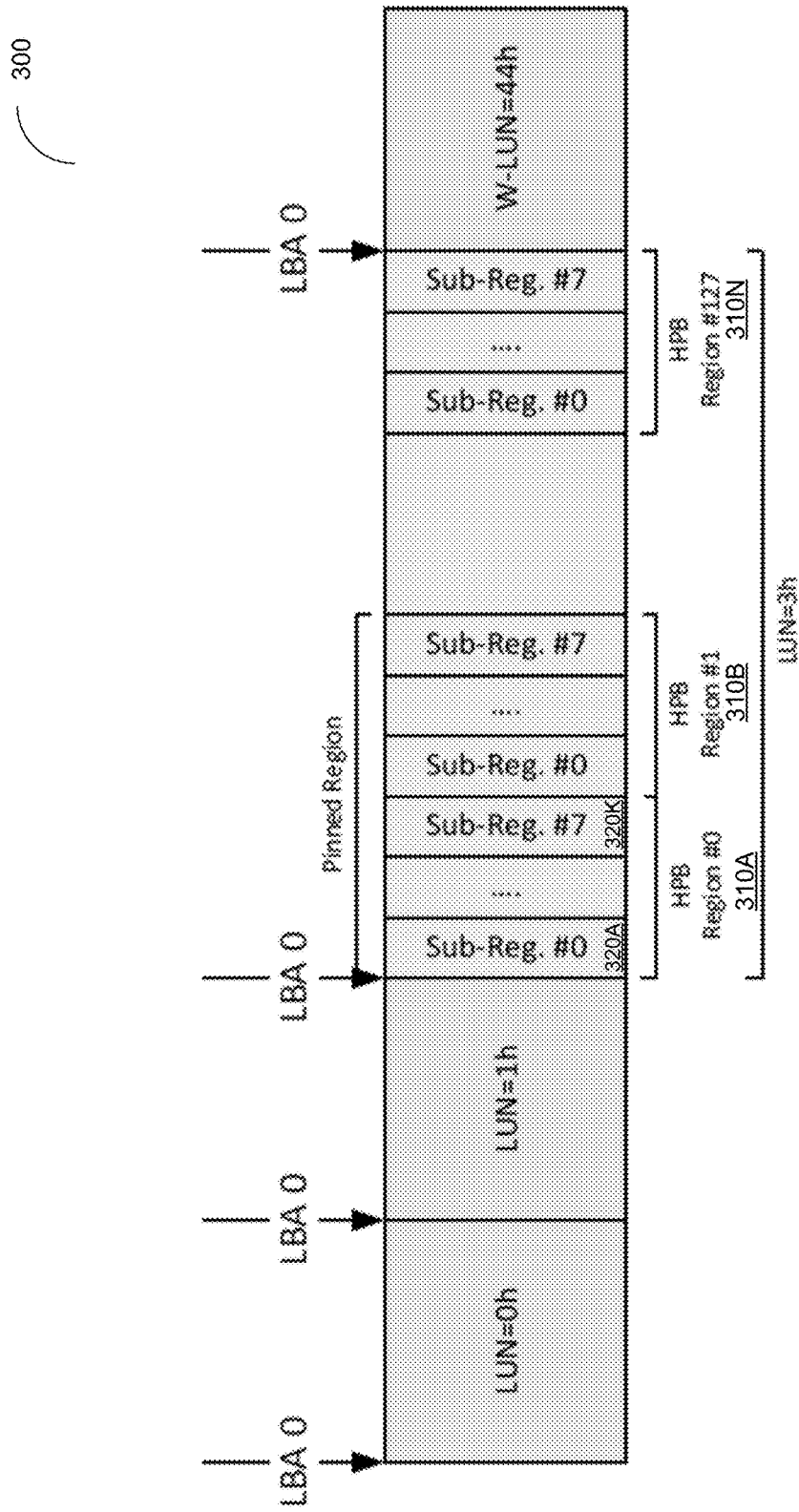
FIG. 3 schematically illustrates an example logical address space of a memory subsystem implemented in accordance with some embodiments of the present disclosure.

FIG. 3 schematically illustrates an example logical address space of a memory subsystem implemented in accordance with some embodiments of the present disclosure. As shown in FIG. 3, the LBA address space 300 is divided into multiple HPB regions 310A-310N. The HPB region is the unit of activation and de-activation of the HPB feature within the logical unit (LU). If the HPB region is too large to transfer the L2P mapping information to the host by a single read operation, then the HPB Region can be divided into multiple HPB sub-regions 320A-320K.

In an illustrative example, the HPB Region size is 2 GB, the logical block size is 4 Kbytes, and the L2P record size is 8 bytes, as described in more detail herein below with reference to FIG. 4. Accordingly, in order to support 10 active regions across all logical units, the host would allocate 40 Mbytes of memory:

40 MB=(2 GB/4 KB)*8 B*10 Regions.

As noted herein above, the memory subsystem can notify the host of activation/de-activation of regions and sub-regions using the response UFS Protocol Information Unit (UPIU) of any completed command. Upon receiving an inactive region identifier, the host system can discard the L2P map data for the inactive HPB region. Conversely, upon receiving an active sub-region identifier (i.e., the region and sub-region indexes), the host system can issue a read buffer command to load the L2P map data for the identified sub-region.

FIG. 4 schematically illustrates the structure of an example L2P map 400 implemented in accordance with some embodiments of the present disclosure. The L2P map 400 is indexed by the LBA value, such that i-th entry of the L2P map 400 stores the PA 410 corresponding to LBA=i and further stores a security token 420, which is utilized to encode the sequential assist value and certain other data pertaining to LBA=i. In some implementations, the PA field 440 can store the result of applying the exclusive disjunction (exclusive or, XOR) operation to the PA and LBA (i.e., PA^LBA), thus reserving the binary value of all "ones" (0xFFFFFFFF) for unmapped LBAs. While in the illustrative example of FIG. 4, the L2P map entry has the size of 8 bytes, including 4 bytes allocated to the PA and 4 bytes allocated to the security token, in various other implementations, L2P map entries and/or their individual fields of other sizes can be implemented.

As schematically illustrated by FIG. 4, the security token 420 is produced by concatenating the power-on reset count 430, the sub-region update count 440, and the sequential assist value 450. The power-on reset count 430 is incremented every time upon the memory subsystem power-up, thus facilitating identification of stale L2P entries. The sub-region update count 440 is a random number that is incremented every time when the sub-region is updated. The sequential assist value 450 is the number of LBAs that sequentially follow the current LBA (i.e., the index of the L2P map entry) and are mapped to consecutive PAs, which, in turn, sequentially follow the PA 410 mapped to the current LBA.

The sub-region table is created by the memory system controller (e.g., controller 115 of FIG. 1), which can retrieve the L2P map for the sub-region from the flash memory (e.g., provided by memory components 112A-112N of FIG. 1) and store the retrieved L2P map in the local static random access memory (SRAM) (e.g., local memory 119 of FIG. 1). The memory system controller reads the L2P map and calculates the sequential assist value for each L2P map entry. As noted herein above, the sequential assist value is the number of consecutive LBAs that are mapped to consecutive PAs sequentially following the PA mapped to the current LBA. The controller then generates, for each L2P map entry, the security token 420 including the power-on reset count 430, the sub-region update count 440, and the sequential assist value 450.

Accordingly, if the logical blocks that the host needs to read are part of an active sub-region, the host can issue, to the memory subsystem, a read command specifying the logical block address, the physical address corresponding to the logical block address, the number of blocks to read, and the sequential assist value corresponding to the logical block address. Responsive to receiving the read command, the controller can read, from the memory component identified by the physical address, multiple memory blocks having consecutive physical addresses, by incrementing the physical address up to the number of times, which is equal to the sequential assist value supplied by the read command. Incrementing the physical address relieves the controller from the otherwise necessary L2P table lookup operation (which, in turn, can necessitate retrieving the L2P table from a non-volatile memory component, such as the memory component 112A-112N), thus reducing the latency of the read operation.

Figure 5:
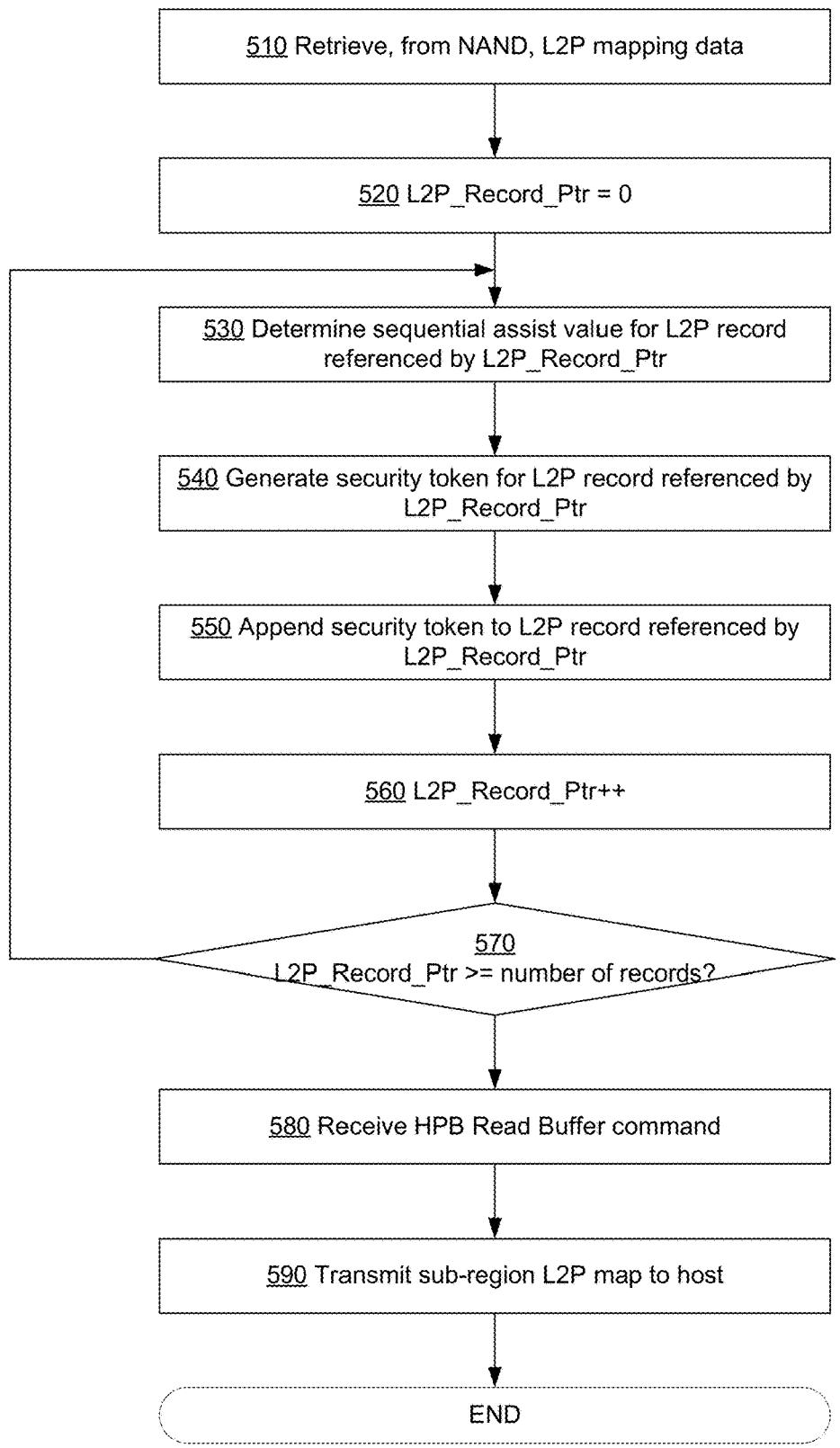
FIG. 5 is a flow diagram of an example method of generating a sequential assist-enhanced L2P table by a memory subsystem controller operating in accordance with some embodiments of the present disclosure.

FIG. 5 is a flow diagram of an example method 500 of generating a sequential assist-enhanced L2P table by a memory subsystem controller operating in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the HPB component 113 of FIG. 1. Although shown in a particular sequence or order, unless otherwise specified, the order of the operations can be modified. Thus, the illustrated embodiments should be understood only as examples, and the illustrated operations can be performed in a different order, while some operations can be performed in parallel. Additionally, one or more operations can be omitted in some embodiments. Thus, not all illustrated operations are required in every embodiment, and other process flows are possible.

At operation 510, the processing device of the memory subsystem controller retrieves, from the non-volatile memory, L2P mapping data for an HPB sub-region. Each L2P record maps a logical block address to a corresponding physical address of the memory block on a memory component managed by the controller, as described in more detail herein above.

At operation 520, the processing device initializes the L2P record pointer in order to iterate through the L2P records for calculating the sequential assist values.

At operation 530, the processing device determines, for the current L2P record identified by the pointer, the sequential assist value specifying the number of logical block addresses that are mapped to consecutive physical addresses sequentially following the physical address specified by the L2P record, as described in more detail herein above.

At operation 540, the processing device generates the security token for the current L2P record. The security token is produced by concatenating the power-on reset count, the sub-region update count, and the sequential assist value, as described in more detail herein above.

At operation 550, the processing device appends the security token to the current L2P record.

At operation 560, the processing device increments the L2P record pointer.

Responsive to determining, at operation 570, that all L2P records for the current sub-region have been processed, the processing continues at block 580; otherwise, the method loops back to operation 530.

Responsive to receiving, at operation 580, an HPB read buffer command from the host system, the processing device, at operation 590, transmits, to the host system, the L2P mapping data for the sub-region specified by the HPB read buffer command, and the method terminates.

While the L2P records that are transmitted to the host system for caching can be encrypted for security reasons, thus preventing the host from compromising the security and integrity of the memory sub-system by modifying the PA values in the read commands issued to the memory sub-system, certain implementations can reveal the sequential assist values of the L2P records to the host system. Accordingly, the host system would be able to utilize the sequential assist information in order to optimize the read commands issued to the memory sub-system: the host system can split each multi-LBA read command into a sequence of read commands that are aligned with the sequential PAs specified by the respective sequential assist values.

FIG. 6 schematically illustrates an example L2P map implemented in accordance with some embodiments of the present disclosure. As shown in FIG. 6, the L2P map 600 includes multiple L2P entries 610A-610E, such that each entry includes the PA 610 and the sequential assist value 620 corresponding to the LBA 630. While the LBA 630 values are shown as being part of the respective L2P entries 610A-610E for the illustrative purposes, the L2P map 600 can be indexed by the LBA values, such that i-th entry of the L2P map 600 would stores the PA 610 and the sequential assist value 620 corresponding to LBA=i. In various other implementations, each L2P entry can include other fields, such as power-on reset count and sub-region update count, as described in more detail herein above with reference to FIG. 4.

Assuming that the host system needs to read five blocks identified by LBAs=0x20 . . . 0x24, the host can utilize the sequential assist information in order to optimize the read commands issued to the memory sub-system: the host system can issue a sequence of two read commands that are aligned with the sequential PAs specified by the respective sequential assist values:

Read LBA=0x20, length=3, PA=0x12, Sequential assist=2

Read LBA=0x23, length=2, PA=0xA2, Sequential assist=6.

Thus, in order to read N consecutive LBAs, provided that the sequential read assist for LBA[0] is L and the sequential read assist for LBA[L+1] is M, such that L+M>=N, the host system would issue two read commands, such that the first read command would read (L+1) blocks and the second read command would read (N−L−1) blocks.

In a more generalized situation, the host system can issue multiple read commands, such that each read command would read the number of blocks which is less than or equal to the current sequential assist value (i.e., the sequential assist value associated with the first LBA to be read by the read command) incremented by one, as described in more detail herein below with reference to FIG. 7. This functionality can be implemented by the memory subsystem driver, which can receive a read command from an application and can split the application-level read command into multiple read commands issued to the memory subsystem.

Figure 7:
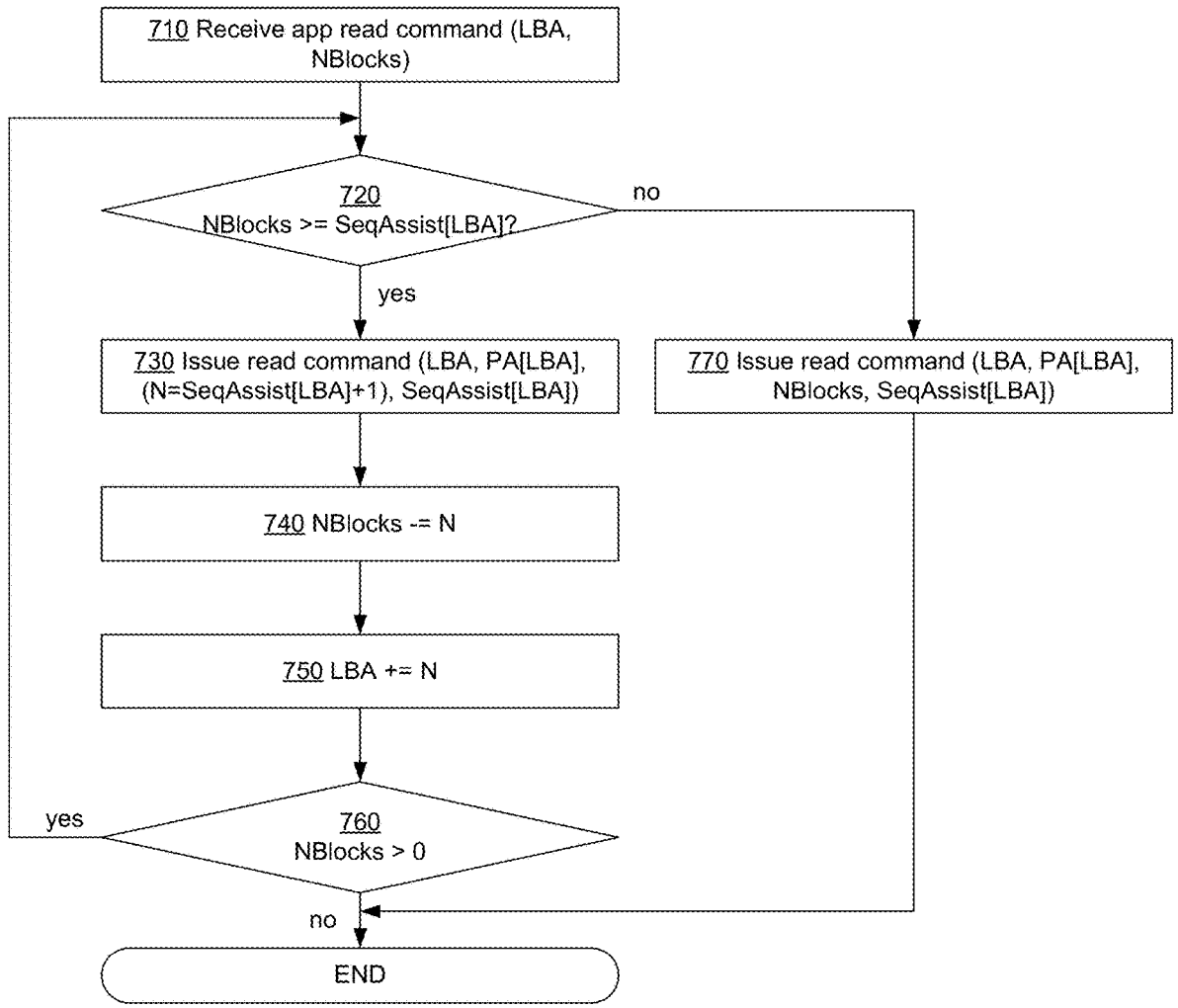
FIG. 7 is a flow diagram of an example method of issuing a sequential assist-enhanced read command by a host system operating in accordance with some embodiments of the present disclosure.

FIG. 7 is a flow diagram of an example method 700 of issuing a sequential assist-enhanced read command by a host system operating in accordance with some embodiments of the present disclosure (e.g., the host system 120 of FIG. 1). The method 700 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. Although shown in a particular sequence or order, unless otherwise specified, the order of the operations can be modified. Thus, the illustrated embodiments should be understood only as examples, and the illustrated operations can be performed in a different order, while some operations can be performed in parallel. Additionally, one or more operations can be omitted in some embodiments. Thus, not all illustrated operations are required in every embodiment, and other process flows are possible.

At operation 710, the processing device of the host system receives, from an application running on the host subsystem, a memory read command specifying the LBA and the number of blocks to be read.

Responsive to determining, at operation 720, that the number of blocks exceeds or is equal to the current sequential assist value, the processing continues at operation 730; otherwise, the method branches to operation 770.

At operation 730, the processing device issues, to the memory subsystem, a read command to read the number of blocks which is equal to the current sequential assist value, starting from the current LBA. The read command further specifies the PA corresponding to the current LBA and the sequential assist value corresponding to the current LBA:

Read (LBA, PA[LBA], (N=SeqAssist[LBA]+1), SeqAssist[LBA])

At operation 740, the processing device decrements the number of blocks to be read by the number of blocks (N) that have been read by the current iteration of the method (i.e., by the sequential assist value corresponding to the current LBA).

At operation 750, the processing device increments the current LBA value by the number of blocks (N) that have been read by the current iteration of the method (i.e., by the sequential assist value corresponding to the current LBA).

Responsive to determining, at operation 760, that the number of blocks to be read exceeds zero, the method loops back to operation 720; otherwise, the method terminates.

At operation 770, the processing device issues, to the memory subsystem, a read command to read the remaining number of blocks, starting from the current LBA. The read command further specifies the PA corresponding to the current LBA and the sequential assist value corresponding to the current LBA:

Read (LBA, PA[LBA], NBlocks, SeqAssist[LBA]), and the method terminates.

Figure 8:
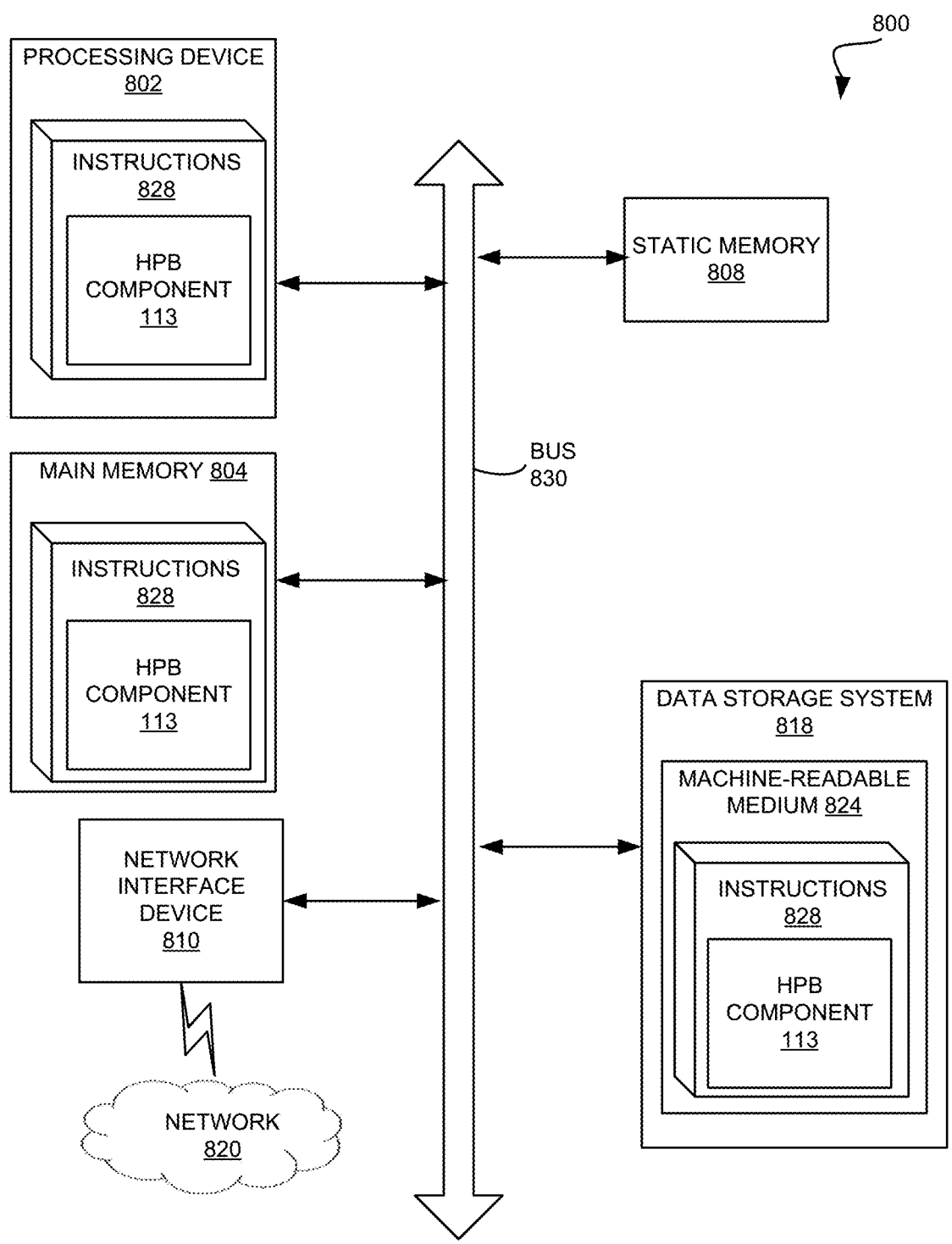
FIG. 8 is a block diagram of an example computer system in which embodiments of the present disclosure can operate.

FIG. 8 illustrates an example machine of a computer system 800 within which a set of instructions, for causing the machine to perform any one or more of the methodologies discussed herein, can be executed. In some embodiments, the computer system 800 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the HPB component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 800 includes a processing device 802, a main memory 804 (e.g., read-only memory (ROM), flash memory, dynamic random access memory (DRAM) such as synchronous DRAM (SDRAM) or Rambus DRAM (RDRAM), etc.), a static memory 808 (e.g., flash memory, static random access memory (SRAM), etc.), and a data storage system 818, which communicate with each other via a bus 830.

Processing device 802 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 802 can also be one or more special-purpose processing devices such as an application specific integrated circuit (ASIC), a field programmable gate array (FPGA), a digital signal processor (DSP), network processor, or the like. The processing device 802 is configured to execute instructions 828 for performing the operations and steps discussed herein. The computer system 800 can further include a network interface device 808 to communicate over the network 820.

The data storage system 818 can include a machine-readable storage medium 824 (also known as a computer-readable medium) on which is stored one or more sets of instructions 828 or software embodying any one or more of the methodologies or functions described herein, including the method 500 of generating a sequential assist-enhanced L2P table by a memory subsystem controller and method 700 of issuing a sequential assist-enhanced read command by a host system. The instructions 828 can also reside, completely or at least partially, within the main memory 804 and/or within the processing device 802 during execution thereof by the computer system 800, the main memory 804 and the processing device 802 also constituting machine-readable storage media. The machine-readable storage medium 824, data storage system 818, and/or main memory 804 can correspond to the memory sub-system 110 of FIG. 1.

In one embodiment, the instructions 828 include instructions to implement functionality corresponding to the HPB component 113 of FIG. 1. While the machine-readable storage medium 824 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
a memory component; and
a processing device, operatively coupled to the memory component, the processing device to perform operations comprising:
receiving a plurality of logical-to-physical (L2P) records, wherein an L2P record of the plurality of L2P records maps a logical block address to a physical address of a memory block on the memory component;
determining a sequential assist value specifying a number of logical block addresses that are mapped to consecutive physical addresses sequentially following the physical address specified by the L2P record;
generating a security token encoding the sequential assist value;
associating the security token with the L2P record; and
transmitting, to a host system, a message comprising a Universal Flash Storage (UFS) Protocol Information Unit (UPIU), wherein the UPIU indicates a host performance boost (HPB) with sequential assist capability.

2. The system of claim 1, wherein the operations further comprise:
responsive to receiving a request from a host system, transmitting at least a subset of the plurality of L2P records to the host system, wherein the subset includes the L2P record.

3. The system of claim 1, wherein the security token further comprises:
an encoding of a power-on reset count.

4. The system of claim 1, wherein the security token further comprises:
an encoding of a sub-region update count.

5. The system of claim 1, wherein the operations further comprise:
receiving, from a host system, a read command specifying the logical block address, the physical address corresponding to the logical block address, and the sequential assist value; and
reading, from the memory component, a plurality of memory blocks having consecutive physical addresses, wherein a number of the memory blocks is less than or equal to the sequential assist value.

6. The system of claim 1, wherein the memory component is a NAND type flash memory.

7. A non-transitory computer-readable storage medium comprising executable instructions which, when executed by a processing device of a controller, cause the processing device to perform operations, comprising:
receiving a plurality of logical-to-physical (L2P) records, wherein an L2P record of the plurality of L2P records maps a logical block address to a physical address of a memory block on a memory component managed by the controller;
determining a sequential assist value specifying a number of logical block addresses that are mapped to consecutive physical addresses sequentially following the physical address specified by the L2P record;
generating a security token encoding the sequential assist value;
associating the security token with the L2P record;
receiving, from a host system, a read command specifying the logical block address, the physical address corresponding to the logical block address, and the sequential assist value; and
reading, from the memory component, a plurality memory blocks having consecutive physical addresses, wherein a number of the memory blocks is less than or equal to the sequential assist value.

8. The non-transitory computer-readable storage medium of claim 7, wherein the operations further comprise:
responsive to receiving a request from a host system, transmitting at least a subset of the plurality of L2P records to the host system, wherein the subset includes the L2P record.

9. The non-transitory computer-readable storage medium of claim 7, wherein the security token further comprises:
an encoding of a power-on reset count.

10. The non-transitory computer-readable storage medium of claim 7, wherein the security token further comprises:
an encoding of a sub-region update count.

11. The non-transitory computer-readable storage medium of claim 7, wherein the operations further comprise:
transmitting, to a host system, a response comprising a Universal Flash Storage (UFS) Protocol Information Unit (UPIU), wherein the UPIU indicates a host performance boost (HPB) with sequential assist capability.

12. The non-transitory computer-readable storage medium of claim 7, wherein the memory component is a NAND type flash memory.

13. A non-transitory computer-readable storage medium comprising executable instructions which, when executed by a processing device of a host system, cause the processing device to perform operations, comprising:
receiving a logical-to-physical (L2P) map comprising a first L2P record and a second L2P record, wherein the first L2P record specifies a first logical block address, a first physical address of a first memory block on a memory component, and a first sequential assist value specifying a number of logical block addresses that are mapped to consecutive physical addresses sequentially following the first physical address, and wherein the second L2P record specifies a second logical block address, a second physical address of a second memory block on the memory component, and a second sequential assist value specifying a number of logical block addresses that are mapped to consecutive physical addresses sequentially following the second physical address;
issuing, to a memory subsystem, a first read command to read a first plurality of blocks starting from the first logical block address, wherein the first plurality of blocks comprises a first number of blocks that exceeds the first sequential assist value; and
issuing, to a memory subsystem, a second read command to read a second plurality of blocks starting from the second logical block address, wherein the second plurality of blocks comprises a second number of blocks that is less than or equal to the second sequential assist value.

14. The non-transitory computer-readable storage medium of claim 13, wherein the operations further comprise:
responsive to receiving, from the memory subsystem, a response comprising a Universal Flash Storage (UFS) Protocol Information Unit (UPIU) specifying an identifier of an active sub-region, transmitting, to the memory subsystem, a read host performance boost (HPB) buffer command identifying the active sub-region.

15. The non-transitory computer-readable storage medium of claim 13, wherein the operations further comprise:
responsive to receiving, from the memory subsystem, a response comprising a Universal Flash Storage (UFS) Protocol Information Unit (UPIU) specifying an identifier of an inactive sub-region, discarding a plurality of L2P records associated with the inactive sub-region.

16. The non-transitory computer-readable storage medium of claim 13, wherein the first sequential assist value is encoded by a security token associated with the first L2P record.

17. The non-transitory computer-readable storage medium of claim 16, wherein the security token further comprises at least one of:
an encoding of a power-on reset count or an encoding of a sub-region update count.

18. The non-transitory computer-readable storage medium of claim 13, wherein the memory component is a NAND type flash memory.

* * * * *